May 9, 1933.  J. M. HORTON  1,908,670
ERASER CLEANING MACHINE
Filed July 21, 1930
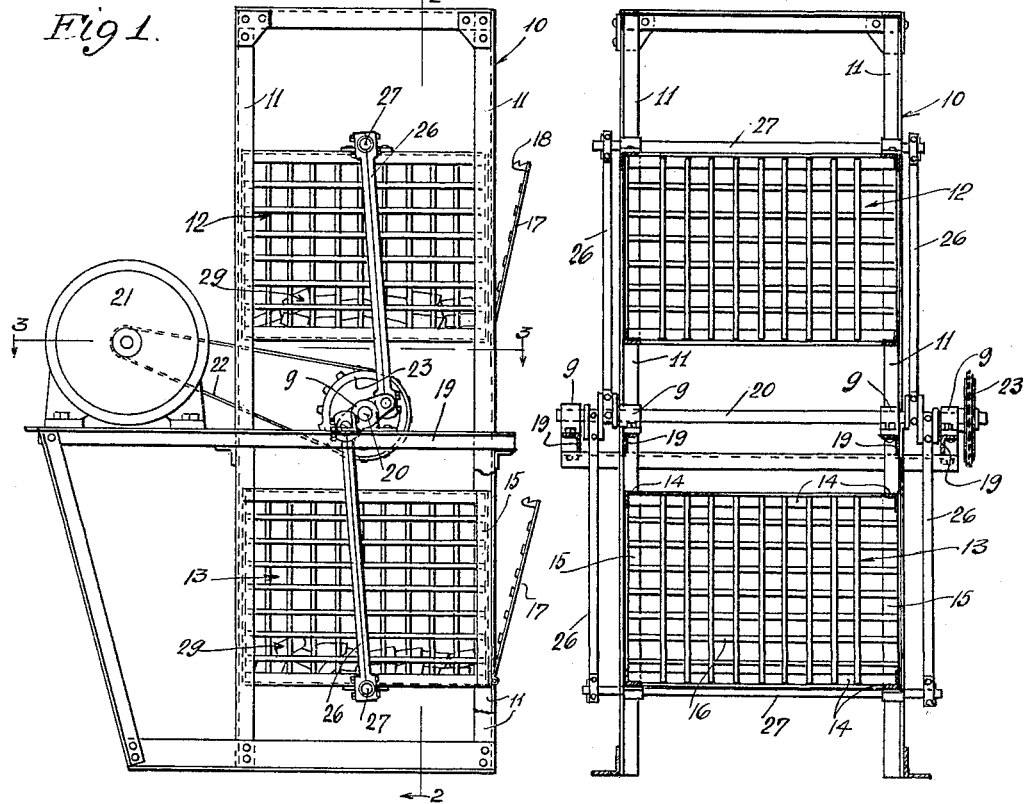
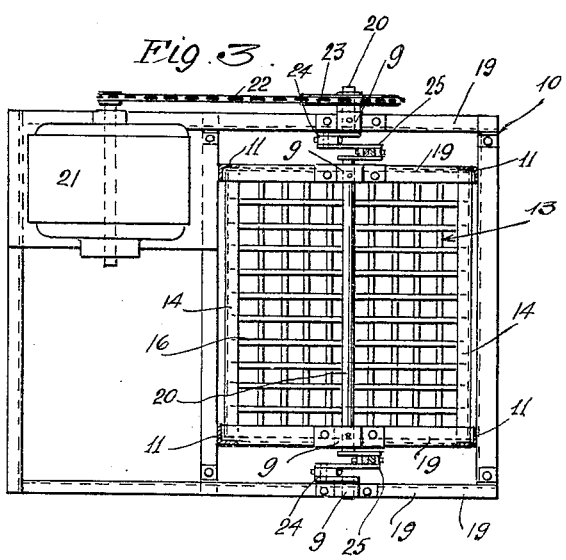
Inventor.
Joseph M. Horton.
Attorney.

Patented May 9, 1933

1,908,670

UNITED STATES PATENT OFFICE

JOSEPH M. HORTON, OF FILLMORE, CALIFORNIA

ERASER CLEANING MACHINE

Application filed July 21, 1930. Serial No. 469,345.

This invention has reference to machines for removing chalk dust and dirt from blackboard erasers, and relates particularly to an improved device for expelling the dust from erasers by jigging them in an apertured container, wherein no special arrangement of the erasers is required.

It is a general purpose of the invention to provide a mechanism of simple and economical construction whereby erasers may be subjected to such severe agitation or jigging as will effectively remove the dust. It may be stated preliminarily that heretofore eraser cleaning devices of this type have been proposed which operate to jig the erasers in an apertured container to which a jigging movement is imparted by intermittently moving it upwardly and allowing it to fall by gravity. The present machine differs characteristically from similar devices of which I am aware in that the container or cage for the erasers instead of being positively moved upwardly only and then allowed to fall by gravity, is positively moved in both its upward and downward travels. By providing for positively moving the cage in both directions, its effectiveness in subjecting the erasers to the severe agitation required for thorough expulsion of the dust, is greatly increased due to the speed at which the cage may be jigged.

In the preferred embodiment of the invention, I provide a pair of such cages operated in their reciprocating movement by crank arm connections with a common drive shaft, the cages being in balanced arrangement at opposite sides of the shaft. It is preferred that the cages be provided in pairs in the arrangement described in order to obviate the unbalanced forces on the crank shaft that would result from the use of a single cage, although it is to be understood that the invention in its broader aspects is not to be considered as limited to the dual arrangement of the cages.

The above features as well as further objects and details of the invention will be understood most readily and clearly from the following description of a typical and preferred embodiment of the invention, reference being had for purposes of description to the accompanying drawing, in which:

Figure 1 is a side elevational view of the machine;

Fig. 2 is a vertical section as viewed on line 2—2 of Fig. 1; and

Fig. 3 is a horizontal section on line 3—3 of Fig. 1.

Referring to the drawing, numeral 10 indicates the frame of the machine which comprises four upright members 11 of angular cross section, which serve as guides for a pair of vertically reciprocable containers or cages 12 and 13. The cages each comprise a box-shaped frame consisting of angle members 14 and 15, to the inner surface of which are welded or otherwise secured coarse screens or strips 16 forming lattice walls on all sides as well as the top and bottom of the cages. Each of the cages is provided with a gate or door 17 having a latch 18 of suitable design which engages the frame to hold the door closed; but though it is preferred for structural reasons to have a vertical wall of the cage open as shown, it is to be understood that I am not to be limited by such showing to a particular type or location of the door. The vertical frame members of the cages 15 have sliding engagement with the angular corner members 11 of the main frame so as to permit vertical reciprocating movement of the cages therein.

At opposite sides of the frame, and at each side of members 11 are pairs of transverse frame rails 19. Mounted on the frame members 19 are bearings 9 within which is journaled the drive shaft 20 by means of which both cages 12 and 13 are actuated in their reciprocating movement. Shaft 20 is shown typically to be driven from motor 21 by way of chain 22 and sprocket 23 carried on one end of the shaft. As shown most clearly in Fig. 3, the shaft carries two pairs of crank arms 24 and 25 at opposite sides of the frame, each of the cages being connected with the crank arms by rods 26 pivoted on the ends of transverse rods 27 mounted on the top and bottom of cages 12 and 13, respectively. The positions of the crank arms 24 and 25 are such that the cages are caused to travel in opposite directions in their reciprocating movement, that is to move toward and away from the drive shaft at the same time, thereby balancing the forces on the shaft. As will be readily apparent, by the provision of two sets of the connecting rods 26 at opposite ends of the drive shaft, the load on the latter is further balanced with resultant greater stability and balanced operation.

In the operation of the machine the erasers 29 are placed in the cages and subjected to an extremely sharp and violent jigging as the cages are reciprocated in the manner described. Due to the fact that the cages are positively moved in both directions of their reciprocating travel, they may be jigged at a high rate of speed and the erasers subjected to such violent agitation that the dust is effectively expelled. Also in being loosely carried within the cages, these erasers will be thrown against the sides of the cage to add to the effect of jigging action in expelling the dust. Ordinarily a suitable form of blower will be provided in conjunction with the machine to remove the dust as it is expelled, no showing of the blower being made in the drawing however since the blower is a common auxiliary used in this connection and comprises no part of the invention.

It will be understood the drawing and description are to be considered merely as illustrative of and not restrictive on the broader claims appended hereto, for various changes in design, structure and arrangement may be made without departing from the spirit and scope of said claims.

I claim:

1. An eraser cleaning machine comprising a guide frame, two vertically spaced and vertically reciprocable cages having closed tops, angular shaped vertically extending cage guide members positioned to receive slidably the cage corners, a motor driven crankshaft extending horizontally intermediate the two cages, two pairs of diametrically opposed cranks on said shaft, and connecting rods attached to the crank and to the opposite sides of the cages to positively reciprocate the two cages toward and away from each other in balanced relation.

2. In an eraser cleaning machine, a vertically reciprocable rectangular cage, a frame comprising guide members adapted to guide said cage in a vertical path, means to vertically reciprocate the cage at such speed as to throw contained articles against the top and bottom of the cage; said cage having a fixed top and a fixed bottom and having one side hinged to open outwardly to afford access to the cage interior.

3. In an eraser cleaning machine, a vertically reciprocable, closed rectangular cage, a frame comprising guide members adapted to guide said cage in a vertical path and means to vertically reciprocate the cage at such speed as to throw contained articles alternately against the top and bottom walls of the cage; said cage having top and bottom and side walls fixed in place to retain erasers within the cage when being reciprocated, and a portion at least of one of said walls being movable to afford access to the cage interior.

In witness that I claim the foregoing I have hereunto subscribed my name this 3rd day of July 1930.

JOSEPH M. HORTON.